United States Patent [19]

Tie et al.

[11] Patent Number: 5,458,313
[45] Date of Patent: Oct. 17, 1995

[54] DISC SPRING CONSTANT COMPENSATING AND HANGING APPARATUS

[76] Inventors: Ronjun Tie; Rongping Tie, both of No. 108, Wazi Qian Street, Yangzhou City, Jiangsu Province, P.R., China

[21] Appl. No.: 49,810

[22] Filed: Apr. 20, 1993

[30] Foreign Application Priority Data

Apr. 22, 1992 [CN] China .................. 92107525.1

[51] Int. Cl.⁶ .................................................. F16M 13/00
[52] U.S. Cl. ............................ 248/613; 248/580; 248/60
[58] Field of Search ................................ 248/613, 610, 248/580, 602, 60, 59

[56] References Cited

U.S. PATENT DOCUMENTS

| | | | |
|---|---|---|---|
| 2,929,397 | 3/1960 | Sloan et al. | |
| 2,939,663 | 6/1960 | Suozzo | 248/613 X |
| 2,946,547 | 7/1960 | Grabe | |
| 3,179,362 | 4/1965 | Wright | 248/613 X |
| 3,588,010 | 6/1971 | Liesegang | 248/613 X |
| 3,637,173 | 1/1972 | Suozzo | 248/60 X |
| 3,936,021 | 2/1976 | Salter | 248/613 X |
| 4,006,873 | 2/1977 | Berger | |
| 4,613,119 | 9/1986 | Hardtke | 248/613 X |
| 4,862,742 | 9/1989 | Pospischile et al. | |

FOREIGN PATENT DOCUMENTS

| | | |
|---|---|---|
| 1426355 | 12/1966 | France . |
| 2286330 | 4/1976 | France . |
| 2365727 | 4/1978 | France . |
| 1205781 | 6/1959 | Germany . |
| 1291581 | 3/1969 | Germany . |
| 2162305 | 10/1972 | Germany . |
| 197803 | 3/1978 | Germany ................ 248/613 |
| 3022864 | 1/1982 | Germany ................ 248/60 |
| 60073152 | 4/1985 | Japan . |
| 2167158 | 5/1980 | United Kingdom . |

OTHER PUBLICATIONS

"Master the Mysteries of Spring Washers", Product Engineering, vol. 50, No. 6, Jun., 1979, pp. 37–40.

*Primary Examiner*—Karen J. Chotkowski
*Attorney, Agent, or Firm*—Ladas & Parry

[57] ABSTRACT

A disc spring constant compensating and hanging apparatus comprises a fixed frame, two swinging frames, two spring units, a movable platen, a hanger plate and two displacement guide bars. The spring unit consists of front platen, rear platen, disc spring and spring rod with its one end extending outward through the center of the disc spring. The two spring units are disposed symmetrically about the vertical central line of the hanging apparatus and connected with the fixed frame. The two swinging frames are pivoted symmetrically on both sides of the fixed frame through the main shafts. One end of each swinging frame abuts against the movable platen via the loading shaft and the wheel, and the other end is rotatably connected to the extending end of the spring rod by a coupling shaft.

8 Claims, 3 Drawing Sheets

DISC SPRING CONSTANT COMPENSATING AND HANGING APPARATUS

TECHNICAL FIELD

The present invention relates to a disc spring constant compensating and hanging apparatus which may be used in the hanging portion such as boiler, burner and pipeline for steam, water, mist, air and coal in the power plants, or the portion where the stress due to displacement should be reduced in petroleum and chemical industry system, it may also be used in the automatic compensating units for the tension of the contact network on electric railway, as well as the belt-tightening means of conveyer and other systems which have to compensate the displacement while acting force is constant.

BACKGROUND OF THE INVENTION

At present, the force-constant spring hanger frames produced according to the standard of Force-Constant Spring Hanger, GB10181, China, the standard of Pipe-System Supporting Unit, Sanwa Co., Japan, and the standard of Pipeline Support-Hanger Frame, ITT Co., USA, have some shortages such as huge volume and heavy weight due to using the cylindrical helical compression springs. Moreover, the pre-pressing deformation of the springs in the above-described GB10181 hanger frame is more than 48% of total deformation amount, so the usability of the springs is very unreasonable. For the springs in a large hanger frame, for example, 50–200 kg weight and 1000 mm length per spring, there are some difficulties on the spring material, thermal processing formation, adjustment of the pitch, end machining, rectifying, heat-treatment, and mounting so that it is difficult to attain designed various technical requirements. In addition, during the movement of the existing spring hangers the horizontal displacement is larger. It is considered that the existing variable spring hanger, in design, are unreasonable products, because there is great contradictory between its design principle and the practical using apparatus.

SUMMARY OF THE INVENTION

It is therefore an object of the invention to provide a hanging apparatus with force-constant spring compensator which has compact structure, light weight and large load-bearing ability and larger displacement, and can keep the displacement vertical.

In accordance with the present invention a spring constant compensating and hanging apparatus is provided. The apparatus comprises a fixed frame, two swinging frames, two spring units, a movable platen, weight-carrying means and two displacement guide bars. The spring unit consists of a front platen, a rear platen, an elastic force-bearing element disposed between the front and rear platen, and a spring rod with its one extending outward through the center of the elastic force-bearing element. The two spring units are disposed symmetrically about the vertical central line (Y-Y) of the hanging apparatus and connected with the fixed frame through the front platen. The two swinging frames are pivoted symmetrically on both sides of the fixed frame by means of main shafts. One end of each swinging frame abuts against the movable platen via the loading shaft and wheel, and the other end is rotatably connected to the extending end of the spring rod by a coupling shaft. The weight-carrying means is connected with the movable platen and hold the force-acting line falling in the vertical central line of the apparatus.

On the other hand, a spring constant compensating and hanging apparatus is provided according to the invention. This apparatus comprises a fixed frame, two swinging frames, a spring unit, a movable platen, weight-carrying means and two displacement guide bars. The spring unit consists of a front platen, a rear platen, an elastic force-bearing element disposed between the front and rear platen, and a spring rod with its one end extending outwards through the center of the elastic force-bearing element. The extending end of the spring rod is connected with a connecting plate. The spring unit is disposed in the vertical central line (Y-Y) of the hanging apparatus and is connected fixedly with the fixed frame by means of the front platen. The two swinging frames are pivoted symmetrically on both sides of the fixed frame by means of the main shaft. One end of the each swinging frame abuts against the movable platen via the loading shaft and wheel, and the other end is hinged respectively with one ends of the two spring sub-rods, while the other ends of the spring sub-rods are hinged respectively with both sides of the connecting plate. The weight-carrying means is connected with the movable platen and holds the force-acting line of weight falling in the vertical central line (Y-Y) of the apparatus.

Preferably, the weight-carrying means is a weight hanger plate whose upper end is connected with the movable platen.

Preferably, the elastic force-bearing element is disc spring.

A further embodiment of the disc spring constant compensating and hanging apparatus is provided according to the invention, and this apparatus comprises a fixed frame, a swinging frame, a disc spring unit, and a weight hanger plate. The disc spring unit consists of a front platen, a rear platen, a disc spring disposed between the front and the rear platen, guide rods of the disc spring, and a spring rod with its one end extending outwards through the center of disc spring. The swinging frame is pivotably connected to the fixed frame by means of the main shaft. The extending end of the disc spring rod is hinged with the swinging frame and the hanger plate is hinged with a hanging end of the swinging frame.

In accordance with the present invention, the disc spring is substituted for the cylindrical spring in the constant hanging apparatus which is now used extensively all over the world, and the principal structure has an important improvement. Therefore, it possesses a series of advantages such as smaller volume, light weight, large load-bearing ability and larger displacement, material saving, simpler producing and mounting process. It surmounts a traditional prejudice which considers that the disc spring hanger can not be made. Moreover, the weight displacement in the present invention is vertical so that the additional stress and the stress transition on the pipeline can be avoided.

BRIEF DESCRIPTION OF THE DRAWINGS

The invention will now be described in detail with reference to the preferred embodiment thereof and the drawing appended hereto, in which.

DETAILED DESCRIPTION OF THE INVENTION

Figure 1:
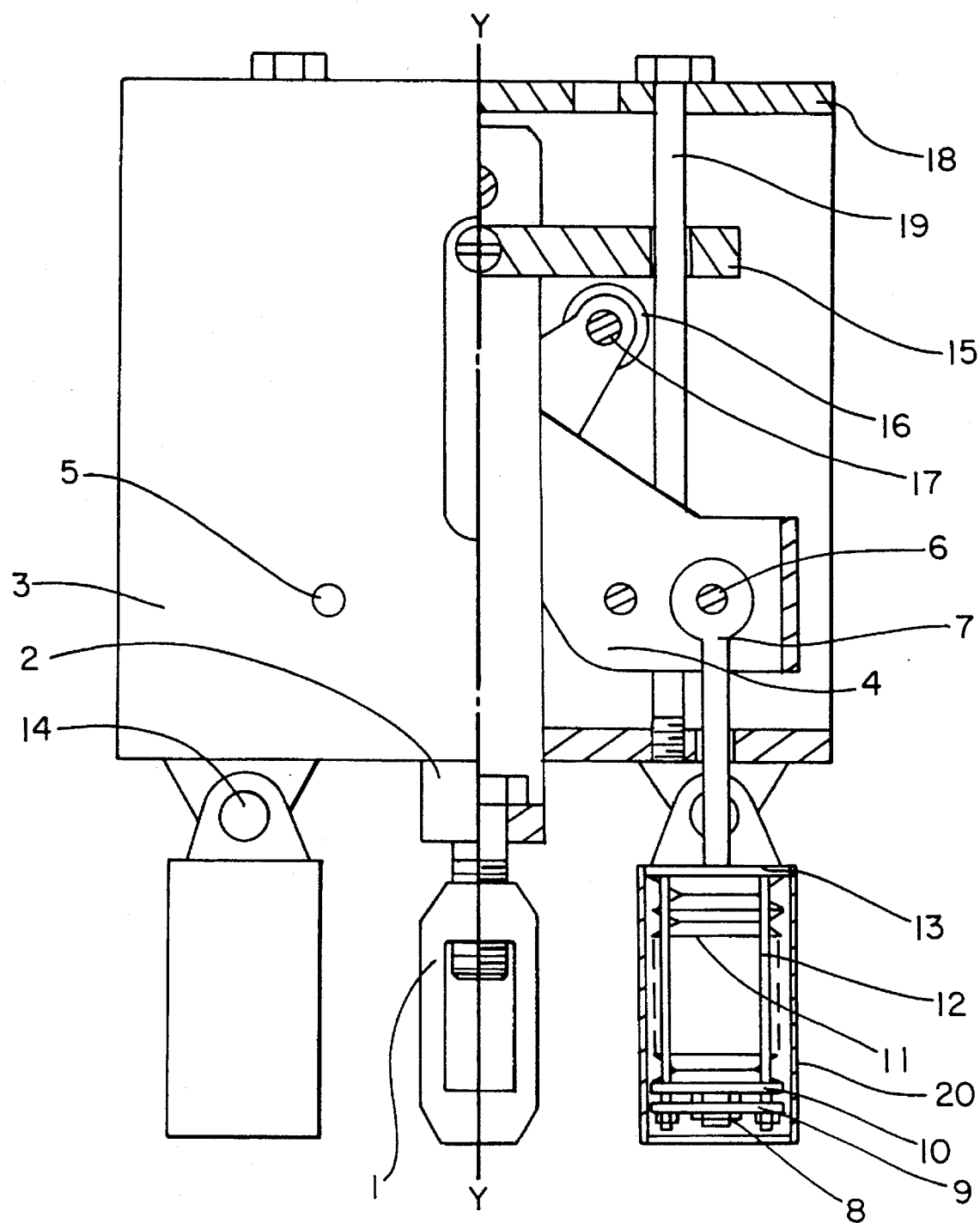
FIG. 1 is a schematic view showing the structure of one embodiment of the hanging apparatus with disc spring constant compensator in accordance with the present invention.

FIG. 1 shows the first embodiment of the invention. As shown in FIG. 1, two fixed frames of the conventional force-constant spring hanger whose displacement and load-bearing ability is equal to each other are designed to be a integral one, i.e. the fixed frame 3 in FIG. 1. Two swinging frames 4 of the disc spring hanging apparatus are symmetrically and pivotably connected on both sides of the fixed frame 3 by means of a main shaft 5.

The end portion, i.e. hanging end, of each swinging frame 4 is provided with a movable wheel 16 by means of a loading shaft 17. A movable platen 15 is arranged on the two movable wheels 16. The loading weight is supported on the movable platen 15, or is hung by a weight hanger plate 2 located below the movable platen 15. The weight which is hung by hanger plate 2 or supported on the movable platen 15 must by arranged in a central line between two swinging frames 4, and the force-acting line of the hanger plate 2 (the weight) must be kept distance-equally parallel to the force-acting line of two movable wheels. The other end of each swing frame 4 is rotatably connected with the upper end of the spring rod 7 by means of a coupling shaft 6 which is located at a random point on the circumference whose center is the main shaft 5 and whose radius is the distance from the main shaft 5 to the coupling shaft 6 (receipt the point at which the force-acting line of the spring falls in the connecting line between the main shaft 5 and the coupling shaft 6). Two disc spring units 20 with disc spring 11 as the elastic force-bearing element are disposed symmetrically about the vertical central line Y-Y of the hanging apparatus. The disc spring unit 20 comprises a front platen 13, a rear platen 10, a disc spring 11 located between the front platen 13 and the rear platen 10, a fixed frame 9, and a spring rod 7. The spring rod 7 passes through the center of the front platen 13, rear platen 10 and the disc spring 11, and its lower end is fixed by a nut 8. The disc spring 11 is guided and limited via three or more guide rods 12 to prevent it from radial displacement. There is a gap of 0.15–1.5 mm between the guide rod 12 and the disc spring 11. In this embodiment, the disc spring 11 is a conventional one in which the ratio of the taper height (ho) to the thickness (t) is 0.3–0.45, i.e. ho/t=0.3–0.45 and the ratio of outer diameter (D) to the inner diameter (d) is about 2, i.e. D/d≈2. The disc spring 11 may be one piece (or set), or several pieces (or sets). It may also be replaced by a cylindrical helical spring or others which possess linear behavior. Each front platen 13 of the disc spring unit 20 is hinged respectively with the fixed frame 3 by means of a pin 14, thus the disc spring unit 20 consisting of the front platen 13, the rear platen 10, disc spring 11 and spring rod 7 may swing relative to the fixed frame 3 around the pin 14. Alternatively, the front platen 13 may be fixedly connected with the fixed frame 3, while the spring rod 7 shall be formed as two portions hinged with each other.

The weight hanger plate 2 and movable platen 15 force the two movable wheel 16 into movement during moving process of the compensator. The force-acting lines of the two wheels 16 are always distance-equally parallel to the force-acting line of the hanger plate 2. Basing on the principle about composition and decomposition of force and moment equilibrium the compensation of the force and displacement can be attained, and the displacement is always kept vertical. Under particular case, the two hanger frames with force-constant disc spring having equal load-bearing and displacing ability may be changed into two hanger frams having unequal load-bearing ability and equal displacing ability.

The rotation loading shaft 17 is limited above the level line of the main shaft 5. Its swinging angle is in the range of 0°–60°, preferably 0°–45°, and its imitation angle, i.e. the angle included between the link line from the loading shaft 17 to the main shaft 5 in FIG. 1 and the direction vertical to the main shaft 5, is 10°–65°, preferably 10°–45°.

Figure 2:
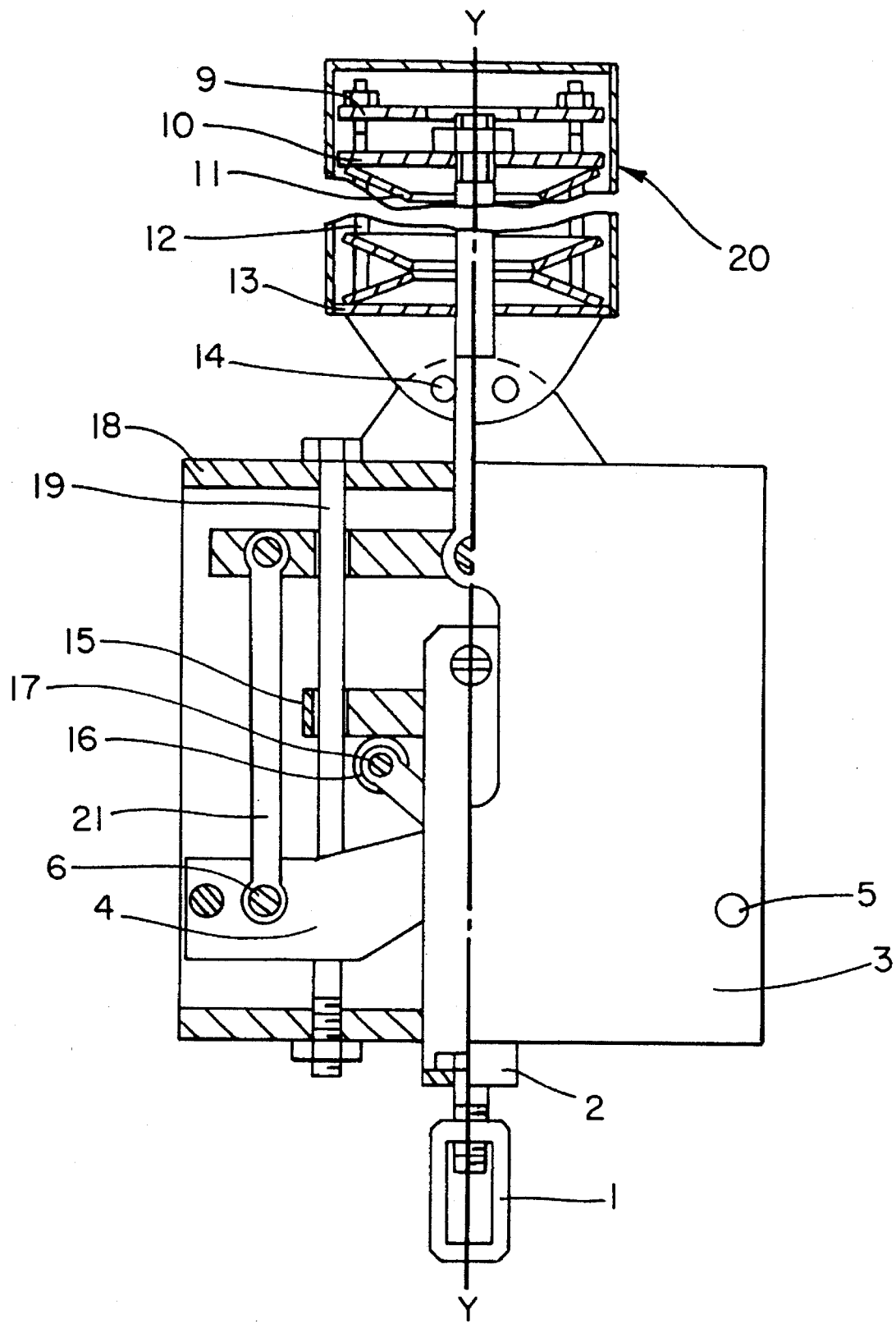
FIG. 2 is a schematic view showing the structure of another embodiment according to the invention.

FIG. 2 shows the second embodiment of the invention in which the same parts as those in FIG. 1 will have the same reference numbers. As shown in FIG. 2, in this embodiment only one spring unit 20 is disposed at the location above or below the central line Y-Y of the fixed frame. One end of the disc spring rod 7 extends outwards through the disc spring unit 20 and is connected with a connecting plate 22. The two sides of the connecting plate 22 are symmetrically and respectively hinged with the ends of two spring sub-rods 21. The other ends of the sub-rods 21 are hinged respectively with the swinging fame 4 by means of coupling shaft 6. Other parts and structure of this embodiment are the same as those in the first embodiment.

The operation of the apparatus of the present invention is as follows: through the fixing plate 18 the apparatus is fixed on a base component by means of bolts. When displacing due to a weight applied, the loading hanger plate 2 drives the movable platen 15 to move along the guide bars 19. The movable plate 15 forces the two wheel 16 to move, the wheel 16, in turn, force the swinging frame 4 to pivot relatively to fixed frame 3 about the main shaft 5. Therefore the swinging frame 4 forces the disc spring 11 to displace and deform due to load-bearing through the coupling shaft 6 and the spring rod 7. In this time, the load acting at hanger plate 2 is the sum of the force acting at the two wheels, and the moment which is formed by the force acting at the two wheels 16 and the distance from its force-acting line to the main shaft 5, and the moment which is formed by the force resulting from the deformation of the disc spring 11 and the distance from the its force-acting line to the main shaft 5, are always in equilibrium during the displacing of the hanger plate 2.

Figure 3:
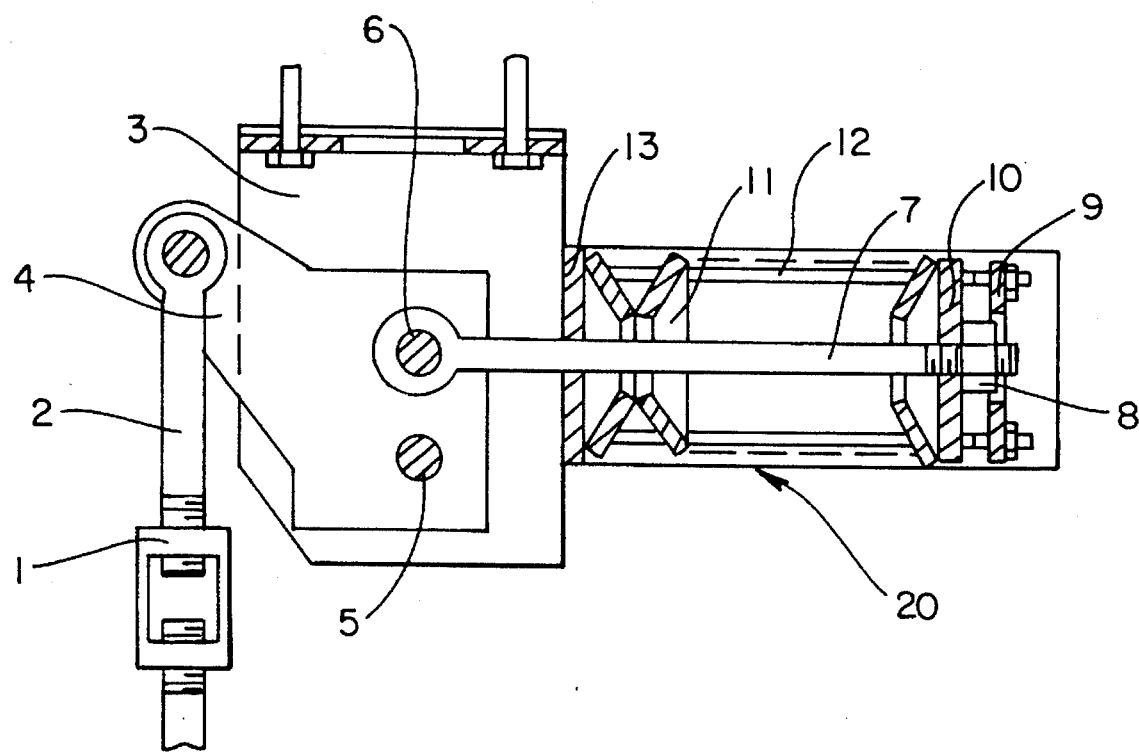
FIG. 3 is a schematic view showing the structure of a further embodiment according to the invention.

FIG. 3 shows the third embodiment of the invention which comprises a disc spring unit 20 similar to that shown in FIG. 1, a fixed frame 3, a swinging frame 4 and a hanger plate 2. The swinging frame 4 is pivotably connected to the fixed frame 3 by a main shaft 5. The spring rod 7 extending from the disc spring unit 20 is hinged to the swinging frame 4 while the hanger plate 2 is hinged to an extending end, i.e. the hanging end, of the swinging frame 4. Other structures are same as those of the first embodiment. The mechanical principle of this embodiment is simple moment equilibrium.

The three embodiments have been described above in accompanying with the drawings. However, it should be understood that the invention shall not be limited thereto, various variations may be made in accordance with the spirit of the invention.

The loading range of the apparatus of the invention is 0.54 KN–400 KN.

The displacing range of the apparatus of the invention is 10–650 mm.

If the loosen-biting nut 1 at lower end of the hanger plate 2 is replaced by a pulleyblock the displacement amount may be increased by multiplying factor.

The apparatus of the present invention may be designed to various form such as vertical, level, supporting, parallel and series one depending on the space position and trend occupied by the apparatus as well as the amount of weight and displacement.

In accordance with the invention a variety of the automatic compensating units for the tension of the contact network in the electric railways may be produced to suit to various case.

The apparatus according to the present invention may also be produced as belt-tightening means of a conveyer.

We claim:

1. A spring constant compensating and hanging apparatus comprising a fixed frame, at least one spring unit which includes a front platen, a rear platen, disc springs provided between said front platen and rear platen, and a spring rod with its one end extending outwards through the center of said disc springs, said spring unit connected with said fixed frame through said front platen, a movable platen, a weight-carrying means connected with said movable platen to have a force-acting line of weight in conformity with a vertical central line of the apparatus, two guide bars which are connected to the fixed frame and guide the movement of said movable platen, two swinging frames disposed symmetrically about the vertical central line of the apparatus and respectively hinged on both sides of said fixed frame by means of a main shaft, each of said swinging frames having one end contacting with said movable platen via a loading shaft and a wheel and the other end connected to said spring rod, said swinging frames capable of tilting about the main shafts and pulling said spring rod to deform the disc springs when a load is exerted on said one end of the respective swinging frame through said weight-carrying means, wherein the ratio of taper height to the thickness of said disc spring is about 0.3–0.45.

2. The apparatus according to claim 1, wherein said weight-carrying means is a hanger plate, an upper end of which is connected with said movable platen.

3. The apparatus of claim 1, wherein said at least one spring unit is disposed on said vertical central line and connected fixedly to the top of said fixed frame through said front platen, the outwardly extending end of the spring rod connected with a connecting plate, and two spring sub-rods, each of which has one end hinged with the other end of the respective swinging frame through a coupling shaft and another end hinged on said connecting plate.

4. The apparatus according to claim 3, wherein the ratio of the outer diameter to the inner diameter of said disc spring is about 2, the spring unit including at least three disc spring guide rods disposed around the circumference of said disc springs and having a gap of 0.15–1.5 mm between said disc springs and said guide rods.

5. The apparatus according to claim 3, wherein a swinging range of said loading shaft is limited above the main shaft and is in a range of 0°–60°.

6. The apparatus of claim 1, wherein said at least one spring unit comprises two spring units disposed symmetrically about the vertical central line and beneath the fixed frame, the other ends of the swinging frames being hinged respectively on the spring rods of the spring units by means of coupling shafts.

7. The apparatus according to claim 6, wherein said front platen of each said spring unit is hinged with said fixed frame by means of a pin.

8. The apparatus according to claim 6, wherein a swinging range of said loading shaft is limited above the main shaft and is in a range of 0°–60°.

* * * * *